June 20, 1972     L. KOVACS     3,671,141

EXTRUDER COMPRISING A SCREW HAVING PEGS

Filed Jan. 8, 1971

INVENTOR.
*LLOYD KOVACS*

BY

*ATTORNEY*

United States Patent Office 3,671,141
Patented June 20, 1972

3,671,141
EXTRUDER COMPRISING A SCREW
HAVING PEGS
Lloyd Kovacs, Somerset, N.J., assignor to Midland-Ross
Corporation, Cleveland, Ohio
Filed Jan. 8, 1971, Ser. No. 105,011
Int. Cl. B29f 3/02
U.S. Cl 416—176                                                2 Claims

ABSTRACT OF THE DISCLOSURE

A specially constructed screw for an extruder of potentially plasticizable materials, e.g., so-called thermoplastic resins, which comprises radially-aligned pegs based in a non-eccentric undercut channel area of the screw core.

DESCRIPTION

Coworkers, Robert Barr and Chan Il Chung, of the party now disclosing disclosed in U.S. Pat. No. 3,487,503 the construction of an extruder screw comprising radially-aligned pegs located within a portion of the channel through which melted material is forwarded. The pegs extend to the full radial height of the screw thread and enforce passage of melted material between the pegs to disrupt the usual flow patterns of melt and cause more effective mixing thereof. The efficient mixing obtained by passage through the pegs is quite useful in eliminating such non-uniformity in the extruded material as to affect the quality of product when the extruder is used, e.g., for yarn or thin-gauge film extrusion.

However, it has been discovered that there are still some undesirable variations of extruded product in the operation of the above-indicated peg construction that should be eliminated, if possible, to avoid, e.g., some unpredictability in the output of an extruder under varying conditions of viscosity, temperature, and work material composition. Furthermore, the pegs substantially reduce the free flow cross section of the channel along transverse planes of the channel occupied by the pegs which is found to cause noticeable rises in temperature of the material passing immediately adjacent the pegs. Thus there are fluctuations in temperature. Hence, there are changes of viscosity that make some manner of revision in the design of a peg equipped screw desirable. This is particularly true of an extruder for blowing film if the pegs are close to the nozzle end of the extruder.

Hence, an important object is to improve the prior art extruder of the type comprising a screw equipped with pegs to enable it to operate without substantial and localized temperature rises in the material issuing from the extruder.

A further object is to avoid restriction in the flow of material through the extruder and to increase the throughput rates of the above prior art extruder with less power input per unit of weight of extruded material.

In achieving the above objects or any others related to this invention, an extruder and, in particular, a screw therefor is provided wherein a melted or otherwise plasticized material is forwarded toward its front or unloading end. In a section of the extruder wherein the material is traversed in the fluid state, the screw comprises a plurality of pegs extending outwardly from the core of the extruder to a surface of revolution swept by the thread of the screw. The pegs are preferably arranged in a row or a group plurality of rows, each row extending transversely of the channel defined by the screw thread.

The present invention resides in screw structure wherein the surface portion of the channel in which the pegs are based is radially undercut with respect to a concentric projection of the normal full diameter core surface to substantially compensate for the cross-sectional loss of the channel due to the presence of the pegs. As an example, the channel surface supporting the pegs may be undercut to the extent that the area between the pegs and any transverse row inwardly from the contentric surface projection equals the upstream-facing funnel area of the pegs located outside the surface projection. Such funnel surface may be calculated as the product of the height of the pegs above the surface projection and their diameter multiplied by the number of pegs occurring in the row under consideration.

In the drawing with which the invention is described below:

Figure 1:
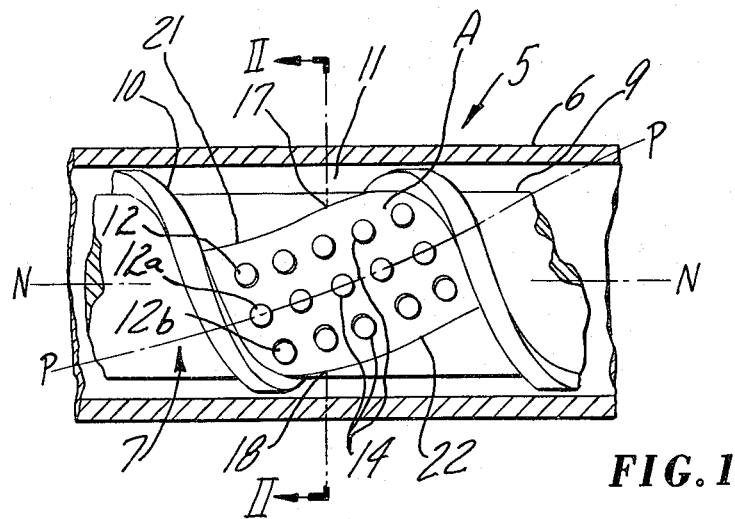
FIG. 1 is a fragmentary longitudinal view of a portion of an extruder screw and an enclosing portion of the extruder barrel shown in section.
Figure 2:
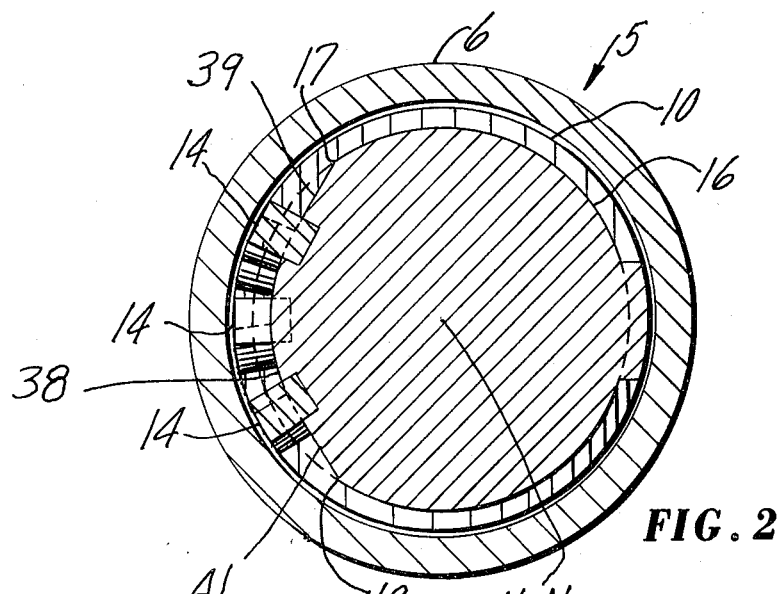
FIG. 2 is a diametral cross section taken along line 2—2 of FIG. 1.

FIGS. 1 and 2 are illustrative of an extruder 5 having a barrel 6 and a screw 7 therein. The screw comprises a core 9 normally tapered substantially throughout the length of the extruder from the front discharge end to the rear feed end, and a thread 10 helically formed on the core to define a helical channel 11 the width of which is measured between successive turns of the thread 10 in a direction transversely of the channel indicated generally by rows 12, 12a and 12b of pegs 14.

The core 9 along any cross section thereof taken perpendicularlly to the axis N—N of rotation of the screw is circular. Along a screw which tapers rearwardly from a larger diameter in the so-called metering section to a smaller diameter in the feed section, the diameter of the core will vary from point to point along the axis N—N.

At the point of cross section for FIG. 2, the circumference 16 of the core is indicated as a true circle or circular surface 10 concentric to the axis N—N.

In FIG. 2, foreground pegs 14 are illustrated as based in an eccentric area A beginning at 17 and ending at 18. This area, if flattened in a plane, is roughly rectangular since it is bounded by successive turns of the thread 10 on opposite sides and lines 21 and 22 on the other pair of opposite sides. The area A is thus undercut with respect to the circumference 16.

Figure 3:
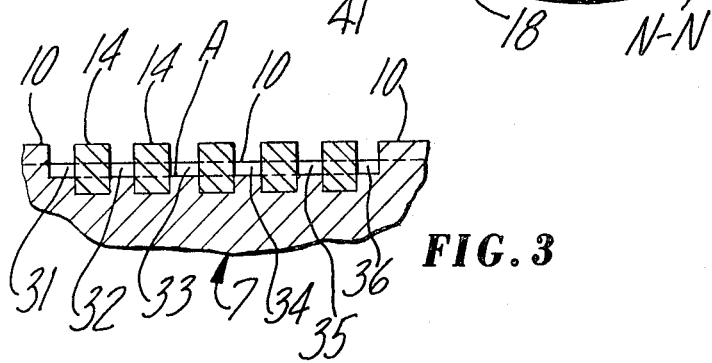
FIG. 3 is a section view taken along P—P of FIG. 1.

In FIG. 3 representing approximately a section along line P—P the area A is shown in undercut relation with the circumferential surface 10 indicated by the dot-dash line spaced above the base area A for the pegs 14. The spacing between line 10, representing the surface of revolution of the portion of the channel surface concentric along circumference 10 to the axis and the line representing base area A is the degree of undercutness relative to the full circumference of surface 10. According to this invention the areas 31–36 between lines 10 and A and between the pegs are approximately or substantially equal to the areas of cross sectional area of the pegs along line or plane P—P measured between the tops of the pegs and line 10. In this manner, areas 31 to 36 provide passageway for material over the area A displaced by the pegs. Mathematically speaking, the surface portion of the channel in which the pegs are based is then radially undercut with respect to a concentric projection of the circumferential surface 10 to an extent that the area between the pegs in any row thereof extending transversely of the channel radially inward from such surface projection equals an area calculated as the product of the height of the pegs above the surface projection and their diameter multiplied by the number of pegs occurring in such row. This principle applies to rows which extend transversely and substantially perpendicularly to the length of channel as measured in a helical path midway of the adjacent thread sides.

In offsetting the bottom surface of the channel inwardly from the full core circumference to provide areas in which to base the pegs 14, each is based in a surface portion of the channel which is undercut with respect to a concentric projection of the adjacent normally full-diameter core surface. In the transverse direction, the undercutting extends along a cross section of the channel substantially perpendicular to the length of the channel as measured along a helix following the middle of the channel. The undercut area in the plane outside of the peg (or pegs) is substantially equal to the cross sectional area of such pegs or pegs cut by the plane located radially outward from said surface projection. Within this general design principle, rows of pegs and the transverse planes passing through such rows may vary, e.g., 10 or 15 degrees from a direction truly perpendicular to the length of the channel.

As shown, a channel surface portion 38 is of arcuate contour of less diameter than the surface 10 but includes transition areas 39 and 41 at each end of the arcuate surface portion that merge it in a gradual manner with the full diameter of the surface 10 to avoid dead spots along the core surface. It will be undertood that in applying the invention to screws having more than one thread, the width of a screw channel as herein understood extends between successive turns of the same thread and bridges portions of other threads occurring therebetween.

What is claimed is:

1. A screw for an extruder adapted to receive and transform a potentially plasticizable material to an approximately homogeneously plastic condition comprising:

a core and a helical thread extending outwardly from the core to a surface of revolution concentric with the longitudinal axis of the core, said thread defining a channel measured in its transverse direction between adjacent turns of said thread, and extending in its longitudinal direction in a helical path lengthwise of the screw, said core at any one point having a generally circular cross section concentric to said axis;

said screw having a rear section and a second section in frontward relation to the rear section which receives said material from the rear section and along which said material is forwarded in a plastic condition in the operation of said extruder;

a plurality of pegs in said second section extending outwardly from said core to said surface of revolution, each of said pegs being based in a surface portion of said channel which is undercut with respect to a concentric projection of the adjacent normally full diameter core surface to the extent that, in planes extending substantially perpendicularly to the length of the channel and extending through the middle of each peg, the undercut area in said planes outside of the pegs but radially inward from said concentric surface projection substantially equals the cross sectional areas of said pegs cut by said planes radially outward from said surface projection.

2. A screw for an extruder adapted to receive and transform a potentially plasticizable material to an approximately homogeneously plastic condition comprising:

a core and a helical thread extending outwardly from the core to a surface of revolution concentric with the longitudinal axis of the core, said thread defining a channel measured in its transverse direction between adjacent turns of said thread, and extending in the longitudinal direction in a helical path lengthwise of the screw, said core at any one point having a generally circular cross section concentric to said axis;

said screw having a rear section and a second section in frontward relation to the rear section which receives said material from the rear section and along which said material is forwarded in a plastic condition in the operation of said extruder;

a plurality of pegs in said second section extending outwardly from said core to said surface of revolution in a pattern wherein the pegs are arranged in a row extending crosswise of said channel at at least one site along said second section; and the surface portion of said channel in which said pegs are based being radially inwardly offset with respect to a concentric projection of the adjacent normally full-diameter core surface to an extent that the area between the pegs in any row thereof extending transversely of the channel which is radially inward from said surface projection equals an area calculated as the product of the height of the pegs above said surface projection and their diameter multiplied by the number of pegs occurring in said row.

References Cited

UNITED STATES PATENTS

| | | | |
|---|---|---|---|
| 2,838,694 | 6/1958 | Munger et al. | 18—12 SM |
| 3,487,503 | 1/1970 | Barr et al. | 18—12 SM |
| 3,511,479 | 5/1970 | Hendry | 259—9 |
| 3,530,534 | 9/1970 | Pomper | 18—12 SB |

J. SPENCER OVERHOLSER, Primary Examiner

N. E. LEHRER, Assistant Examiner

U.S. Cl. X.R.

18—12 SM; 259—9